United States Patent Office 3,349,437
Patented Oct. 31, 1967

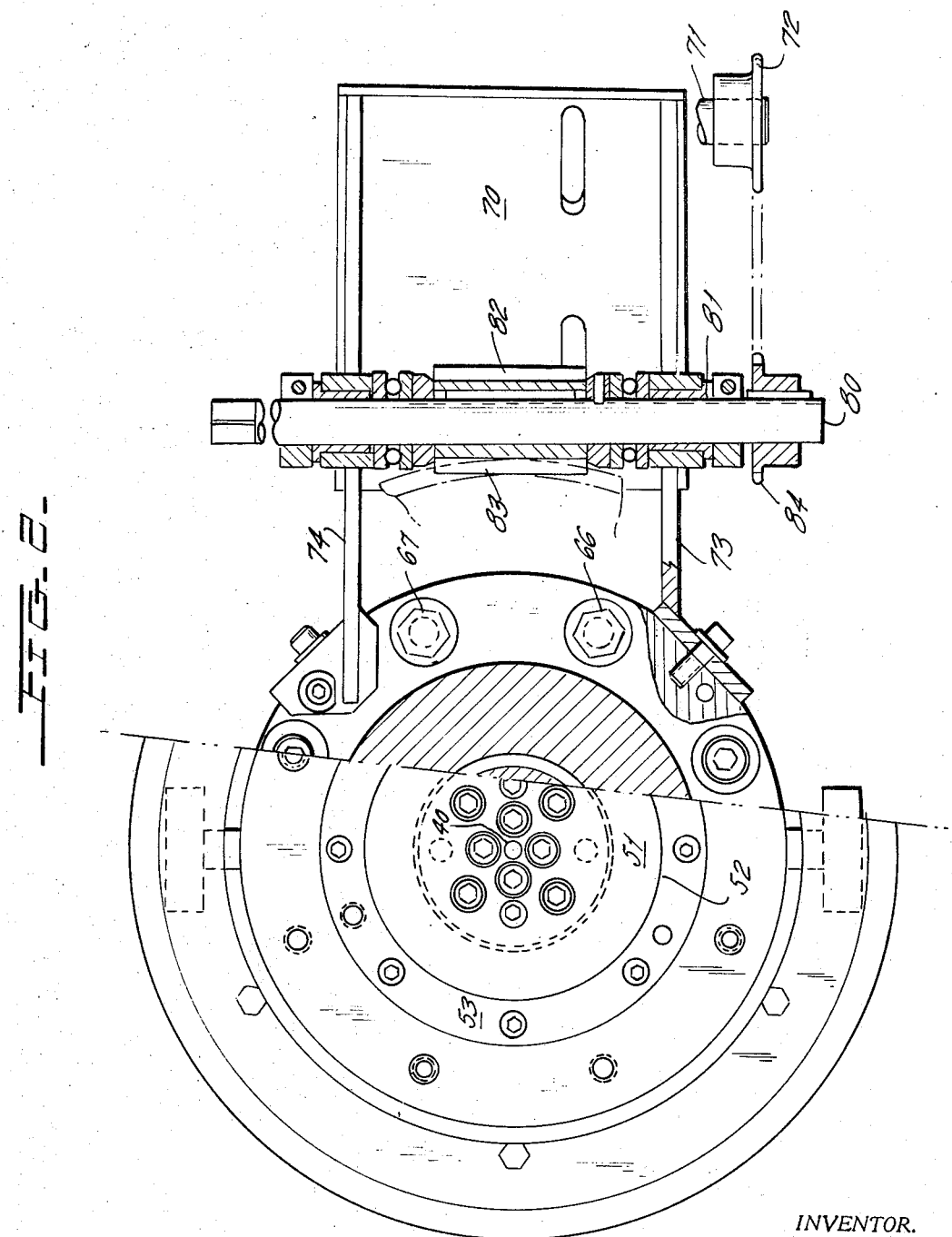

3,349,437
ROTATING DIE CAP FOR EXTRUSION DIE
John Joseph Quackenbush, Monroe, Conn., assignor to National Distillers and Chemical Corporation, New York, N.Y., a corporation of Virginia
Filed Dec. 8, 1965, Ser. No. 512,419
4 Claims. (Cl. 18—14)

ABSTRACT OF THE DISCLOSURE

A plastic tube extrusion die having a circular discharge orifice formed between an inner and outer die cap rotatably mounts only the outer die cap with respect to the inner die cap. Combined radial and axial thrust bearings carry the outer die cap with respect to the main central mandrel of the die, and the outer die cap is rotated in order to distribute gauge bands around the extruded tube. The central stationary die structure can have several input conduits extending to various extruder connections since the central structure does not rotate.

---

This invention relates to tubular plastic extrusion apparatus and more particularly relates to an extrusion die having a rotatable outer cap section which forms the outer surface of the die discharge orifice whereby gauge bands, or bands of increased thickness are distributed around the tube being extruded.

Extrusion dies for the extrusion of hollow tubes or films of extrudible plastic are well known. It is also well known that the extrusion apparatus will frequently cause gauge bands, or bands of increased tube wall thickness running along the axis of the tube. Such gauge bands are caused mainly due to imperfections in the annular discharge orifice. When film including such gauge bands is wound into a roll, the gauge bands wind upon one another to form a "hard-spot" in the roll, which upsets the roll geometry. Also, when the film is unwound from the roll, the high spot will cause the film immediately adjacent thereto to permanently stretch, thereby causing the film to belly out.

Many attempts have been made in the past to eliminate this problem by causing the gauge bands to wind around the film, or oscillate about some center line. If this is done, as the film is wound into a roll, the gauge bands will be distributed along the length of the roll to avoid the problems of an accumulating gauge band. To this end, the complete die structure has been rotated or oscillated as the film is extruded, to cause the gauge band to wind about the ultimate film roll. Other attempts to distribute the gauge band have used rotation or oscillation of the mandrel, or center portion of the die orifice, and rotation or oscillation of sizing mandrels contained within the film tube. In most of these arrangements, however, the molten plastic entering the die must pass through a rotating joint which is difficult to seal.

The present invention provides a novel die structure in which the outer die cap, forming the outer surface of the annular discharge orifice, is rotated or oscillated, thereby causing the desired variation of gauge band position on the extruded tube. This novel arrangement further permits extremely efficient sealing or gasketing at the rotating joint so that the high pressure molten plastic is effectively sealed as it passes the rotating joint. Moreover, the novel arrangement permits its use in those dies which have a plurality of auxiliary channels leading to the discharge orifice which are connected to respective extruders for the formation of a laminated film.

Accordingly, a primary object of this invention is to provide a novel plastic extrusion die which has a rotatable die cap for varying gauge band position on a tubular film.

Another object of this invention is to provide a novel extrusion die which distributes gauge band variation which can be effectively gasketed against high pressure molten plastic.

A further object of this invention is to provide a novel extrusion die having a rotatable die cap for randomizing gauge band variation and which can be applied to dies having a plurality of input plastic channels.

Another object of this invention is to provide a novel rotatable die structure in which a minimum mass is subject to rotational movement.

A further object of this invention is to provide a novel rotatable die structure in which a minimum area is subject to sealing.

These and other objects of this invention will become apparent from the following description when taken in connection with the drawings, in which:

FIGURE 2 is a cross-sectional view of FIGURE 1 taken across the section line 1—1 in FIGURE 2.

Figure 1:
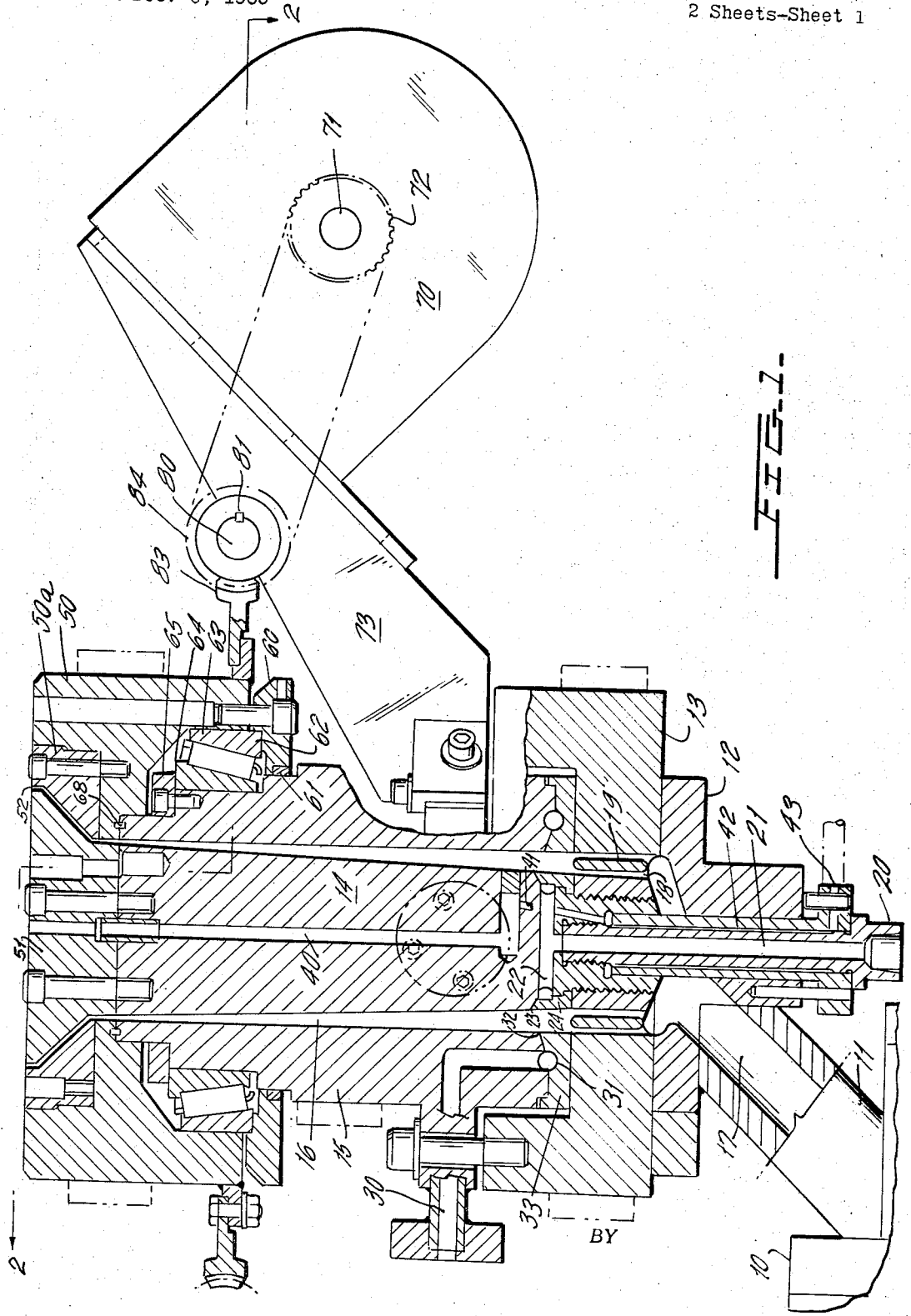
FIGURE 1 is a cross-sectional view taken through the axis of an extrusion die constructed in accordance with the invention.

Referring now to the figures, FIGURE 1 shows an adapter 10 which can be connected to a suitable extruder (not shown) and can serve as a support for the extrusion die. A conduit 11 is then connected to die base 12 which is connected to lower die body 13. The lower die body 13 threadably receives central die core or mandrel 14 which is surrounded by an outer die body 15 with an annular channel 16 defined between core 14 and body 15.

Central passage 17 of conduit 11 communicates with channel 16 through overlapping channels 18 and 19 in lower body 13.

Thus, in FIGURE 1, a second extruder or second source of molten plastic is connected to connector 20 which extends through lower body 12 and is threadably secured to mandrel 14, as shown. Channel 21 extending through connector 20 then communicates with channel 22 in mandrel 14 which, in turn, communicates with annular slot 23 between insert 24 and mandrel 14. Thus, molten plastic forced through channel 21 will be discharged into the interior surface of channel 16 to flow laminarly with the plastic material from channel 17.

A third source of plastic is then connected to conduit 30 which extends through outer die body 15 to annular channel 31 and annular discharge orifice 32 which surrounds the outer surface of channel 16. Note that discharge orifice 32 is defined between insert 33 and the bottom of outer die body 15. Thus, plastic material from channel 30 will coat the exterior surface of the material flowing up channel 16 so that three layers will flow up channel 16 with laminar motion.

The mandrel 14 is further provided with a central air passage 40 which is used to apply air pressure to the interior of the plastic bubble extruded from the die. Channel 40 communicates with channel 41 in mandrel 14 and an annular channel 42 in connector 20 to an air pressure connection means 43 which suitably communicates with annular channel 42.

From the structure described to this point, it will be seen that input conduits 11, 20 and 30 should preferably be stationary members since they are connected to bulky extruders and carry high pressure molten plastic. Moreover, the members through which they pass (lower body 12, mandrel 14, and outer die body 15) should also be stationary. Therefore, and unless extraordinarily complex mechanisms are used, it is not possible to use the typical prior art type of means for obtaining gauge band oscillation or rotation, hereinafter collectively referred to as gauge band rotation.

In accordance with the present invention, the outer die cap 50 is arranged to be rotatable with respect to the inner die cap 51, thereby to effectively rotate gauge bands in the plastic tube issuing from the discharge orifice 52 defined between the outer die cap 50 and inner die cap 51.

Referring to FIGURES 1 and 2, inner die cap 51 is bolted by a suitable arrangement of "push-pull" bolts to the top of mandrel 14. Outer die cap 50, having a suitable insert 50a secured to cap 50 by suitable "push-pull" bolts, then defines a discharge channel which communicates with channel 16 and terminates at discharge orifice 52. Note that insert 50a and inner die cap 51 are easily removable and replaceable to use different sets defining any desired discharge orifice radius desired within a range, for example, of two inches to five inches without changing any other portion of the die structure.

The manner in which die cap 50 is rotatably mounted is best shown in FIGURE 1 and includes a lower plate 60 which is rotatably arranged about the outer surface of outer body 15 and engages body 15 over the annular bearing 61. A combined radial and thrust bearing 62 including races 63 and 64 separated by roller bearings 65 seats atop plate 60, with race 63 engaging plate 60 and race 64 engaging the outer surface of outer body 15. An upper retaining plate 65 is then bolted to a flat shoulder or outer body 15, as shown, and bears against the top of race 64. Thereafter, the outer die cap 50 is placed over the bearing 62 and is secured by a plurality of anchor bolts, such as bolts 66 and 67 in FIGURE 1 to the plate 60, drawing plate 60 up until the bearing 62 is secured between plates 60 and 65. Thereafter, the inner die cap 51 is bolted into position.

The outer die cap will now be able to rotate with plate 60 and on bearing 62 with respect to the inner die cap 51, mandrel 14 and outer die body 15. A good pressure seal has been found to be formed by a ring 68, of Teflon, or any other suitable material, between outer die cap 50 and outer die body 15.

Any suitable mechanism may now be used to apply rotational motion to the outer die cap 50.

FIGURES 1 and 2 show a typical rotating mechanism which includes a gear motor 70 which has an output shaft 71 connected to a sprocket 72. The motor 70 is supported from a pair of arms 73 and 74 which are bolted to the outer die body 15. A shaft 80 having a key channel 81 therein is suitably rotatably mounted by arms 73 and 74. A worm gear 82 is then keyed to shaft 80 and cooperates with a large spur gear 83 welded to outer die body 15. A suitable chain then connect sprockets 72 and a sprocket 84 keyed to shaft 80 whereby motor 70 can be seen to rotate outer die cap 50 through shaft 80, worm gear 82 and spur gear 83.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. An extrusion die for extruding a hollow tube of plastic; said extrusion die comprising a fixed central die core structure; a fixed outer body structure surrounding said central die core structure and spaced therefrom to define an annular channel, the lower end of said annular channel connectible to a source of molten plastic under pressure; a rotatable outer die cap positioned on top of said outer body structure; and mounting means rotatably connecting said rotatable outer die cap structure to said outer body structure; said rotatable outer die cap having a central opening therethrough and surrounding and spaced from the top of said central die core structure to form a discharge orifice for said channel, and rotation means connected to said rotatable die cap for rotating said rotatable die cap about the axis of said annular channel.

2. The extrusion die of claim 1 which further includes second and third channel means extending through said fixed central die core structure and said fixed outer body structure; said second and third channel means connectible to second and third sources of molten plastic under pressure.

3. The extrusion die of claim 1 wherein said mounting means includes a combined thrust and radial bearing having a first and second race separated by roller bearings; said first race connected to said outer die body; said second race connected to said outer die cap.

4. The extrusion die of claim 2 wherein said mounting means includes a combined thrust and radial bearing having a first and second race separated by roller bearings; said first race connected to said outer die body; said second race connected to said outer die cap.

References Cited
UNITED STATES PATENTS

| | | | |
|---|---|---|---|
| 2,345,086 | 3/1944 | Decker et al. | 18—14 |
| 2,978,748 | 4/1961 | McCauley et al. | 18—14 |
| 3,020,588 | 2/1962 | Ferguson et al. | 18—14 XR |
| 3,024,494 | 3/1962 | Szpile | 18—13 |
| 3,221,372 | 12/1965 | Liberman | 18—14 |
| 3,223,761 | 12/1965 | Roley | 18—14 |
| 3,241,503 | 3/1966 | Schafer | 18—13 XR |

WILLIAM J. STEPHENSON, *Primary Examiner.*